United States Patent [19]

Wauters et al.

[11] 4,207,346

[45] Jun. 10, 1980

[54] PROCESS FOR MAKING HIGH DENSITY BREAD FOR USE IN A STUFFING MIX

[75] Inventors: Ronald P. Wauters, Dover, Del.; Stuart A. Cochran, Monticello, Ind.; Ralph E. Kenyon, Dover, Del.

[73] Assignee: General Foods Corporation, White Plains, N.Y.

[21] Appl. No.: 889,472

[22] Filed: Mar. 23, 1978

[51] Int. Cl.$^2$ .............................................. A21D 13/00
[52] U.S. Cl. ...................................... 426/19; 426/62; 426/551
[58] Field of Search ................... 426/19, 62, 551, 473, 426/465

[56] References Cited

U.S. PATENT DOCUMENTS

| | | | |
|---|---|---|---|
| 1,369,724 | 2/1921 | Benz, Jr. | 426/27 |
| 2,660,134 | 11/1953 | Bertrand | 426/27 |
| 2,953,460 | 9/1960 | Baker | 426/19 |
| 3,033,132 | 5/1962 | Duncan et al. | 426/486 |
| 3,066,029 | 11/1962 | Jeffreys | 426/19 |
| 3,429,712 | 2/1969 | Turner | 426/27 |
| 3,862,339 | 1/1975 | Balboni | 426/19 |
| 3,870,803 | 3/1975 | Siems et al. | 426/128 |
| 3,870,806 | 3/1975 | Capossela et al. | 426/152 |

OTHER PUBLICATIONS

Pyler, *Baking Science & Technology*, vol. 11, Siebel Publishing Co., Chicago, Ill. 1973 pp. 677–681 and 755–756. Tripples and Kilborn Cereal Chemistry, vol. 54(1), 1977, "Factors Affecting Mechanical Dough Development".

*Primary Examiner*—Raymond N. Jones
*Assistant Examiner*—Elizabeth A. Hatcher
*Attorney, Agent, or Firm*—Mitchell D. Bittman

[57] ABSTRACT

Process for preparing a high density bread having a relatively strong cell structure which is suitable for making bread crumbs or cubes for use in stuffing mix which comprises preparing a fully developed yeast containing bread dough with an initial mixing to full development, and resting said developed dough. Thereafter dividing, and then baking said dough, during baking the dough being initially subjected to a temperature sufficiently high and for a period of time effective to kill the yeast and prevent substantial oven spring and then continuing baking until the bread dough is fully baked. This process is carried out either without a proofing step or with a minimal proofing step prior to the baking of the dough, the proofing and oven spring being limited so that the density of the resultant baked bread is within the range of about 17 to 36 lbs/cubic foot. The bread is then staled and divided into crumbs or cubes for incorporation into a stuffing mix. The bread crumbs or cubes obtained according to this process have structural strength, an excellent taste, and a density of from about 12 to 22 lbs/cubic foot. The crumbs also hydrate without the formation of a pasty mass and generally retain their individual identity in a stuffing.

25 Claims, No Drawings

PROCESS FOR MAKING HIGH DENSITY BREAD FOR USE IN A STUFFING MIX

BACKGROUND a. Field of the Invention

This invention is concerned with bread and the process for making it. More particularly this invention relates to bread which is utilized in making a stuffing mix. Desired characteristics of bread used in stuffing mixes is that it have an acceptable flavor which results in large measure from the action of the yeast, that it have a strong cell structure and that it be dense.

Among the problems encountered by the prior art in producing satisfactory bread for stuffing is that when the bread crumbs or cubes are added to the other contents of a stuffing mix and hydrating during a cooking process there is a tendency for the individual crumbs or cubes to lose their identity and the bread portion of the stuffing mix to become a pasty mass. The result can be a very pasty and unsatisfactory stuffing. It is thus desirable that the bread crumbs or cubes utilized in the stuffing mix have a high density, and strong cell structure in order to provide a satisfactory base for the stuffing and to stand up to the processing and cooking conditions to which stuffings are subjected.

b. Prior Art

In general, when it was desired to produce crumbs or cubes having a higher density for utilization in the production of prepackaged stuffing mixes this was obtained by simply compressing ordinary baked bread in order to decrease the volume, staling, slicing and cubing the bread. The crumbs or cubes resulting from such processes when added to a stuffing mix and hydrated had a tendency to break down and lose their identity in one mass of pasty stuffing.

In the customary processes of making bread, whether the sponge, continuous or the straight dough method is adopted, the dough is generally subjected to an intermediate proofing and also a final pan-proofing in order for the dough to rise to its desired baking height and to allow the yeast to enhance the flavor of the product. Formation of minute cells and their expansion in the dough during proofing as well as during baking (oven spring) in the usual bread baking process is largely responsible for the resulting delicate cell structure and when utilized in a stuffing mix can produce a pasty and undesirable stuffing which results when hydration takes place. Furthermore, following routine procedures for baking, the bread requires an extended manufacturing period for the proofing steps involved and the resulting bread is of a low density which is crushed if a higher density is desired. Such bread is also baked at a lower temperature for a longer time in order to maintain the blowing action of the yeast during the baking (oven spring).

SUMMARY

This invention is directed towards a process for the preparation of bread crumbs or cubes for packaged stuffing mixes and the product obtained therefrom, and specifically for obtaining bread cubes or crumbs having an excellent taste, a high density, and a structural strength, which when incorporated in a stuffing mix produces a stuffing that is not pasty, and the individual crumbs or cubes maintain their individual identity and don't coalease into a pasty mass.

The process of this invention involves mixing a yeast containing bread dough to a fully developed state, resting the fully developed dough, and then dividing said dough. Thereafter the dough is baked, during baking the dough being initially subjected to a temperature sufficiently high and for a period of time effective to kill the yeast and prevent substantial oven spring and then continuing baking until the bread dough is fully baked. The process is carried out either without a proofing step or with a minimal proofing step prior to baking of the dough, the proofing and oven spring being limited so that the density of the resultant baked bread is within the range of about 17 to 36 lbs/cubic foot. Then the baked bread is staled, sliced and diced into crumbs or cubes suitable for use in a stuffing mix.

DETAILED DESCRIPTION OF THE INVENTION

In the customary procedure of obtaining a crumb or cube for stuffing on a commercial basis the art generally utilizes the common steps in the preparation of commercial bread, i.e., development of the dough in a mixer and development trough, either utilizing the sponge, continuous or straight dough method, dividing the dough, balling, intermediate proofing, sheeting, panning the dough, and having an additional final pan-proofing, and then baking at temperatures generally on the order of 350° to 400° F. where additional development of the dough takes place by action of the yeast (oven spring). Thereafter, the loaf, following cooling, may be crushed to further increase the density for use in preparation of the stuffing. The bread is then sliced, staled and diced and further processed into the stuffing mix.

According to the present invention, a dense bread ideally suited for utilization in the preparation of a stuffing mix is obtained by a shortened process which eliminates the step of crushing the baked bread to mechanically obtain the desired density, eliminates or substantially reduces both intermediate and final proofing and prevents substantial oven spring while maintaining a uniform consistency of cells in the dough, producing a crumb or cube with increased structural strength having strong thick walled cells, the cube or crumb having an excellent taste and an increased density over that obtained by the usual methods.

The process of this invention includes the formation of a yeast containing bread dough, the formation or development of the dough being typically carried out by either the sponge, continuous or the straight dough method, mixing the dough to a substantially fully developed state, then allowing the dough to rest for approximately a one to two hour period to develop the elasticity of the dough and to allow the development of the gluten and flavor. Thereafter the dough is divided, rounded (balled), sheeted, and then baked (pan or hearth), during baking the dough being initially subjected to a temperature sufficiently high and for a period of time effective to kill the yeast and prevent substantial oven spring and then continuing baking until the bread dough is fully baked. This process being carried out either without a proofing step or with a minimal proofing step prior to the baking of the dough, the proofing and oven spring being limited so that the density of the resultant baked bread is within the range of about 17 to 36 lbs/cubic foot. The baked bread is then staled, and divided (sliced and diced) into crumbs or cubes suitable for use in a stuffing mix.

The bread dough formulation employed in the process of this invention generally comprises: flour 100%, water 50 to 70%, salt 0 to 3%, sugar 0 to 8%, yeast 1 to 2½%, shortening 0 to 8% (preferably 2 to 4%), milk or milk substitute 0 to 4%, color 0 to 0.5% and a mold inhibitor (e.g., calcium propionate) 0 to 0.4%, all percentages being by weight based on flour being 100%. Preferably the dough formulation is relatively low in fat or shortening (less than 4%) as generally the lower the fat or shortening content the firmer the resultant baked bread. The dough formulation can additionally contain or contain as a substitute for a portion of the flour ingredients such as corn meal, cellulose fibers, wheat bran, wheat germ, oat hulls, triticale, etc., to add fiber to the resultant baked bread or to provide a textural variation.

The type of flour employed in the instant invention can be one employed in the art of making bread, e.g., wheat, rye, corn, soy, rice, potato, peanut etc. However, preferably the flour has a low alpha-amylase (malt enzyme) activity, a high protein and a low ash content to aid the formation of a strong cellular structure which in turn helps prevent the resultant bread crumbs or cubes from becoming a pasty mass when incorporated into a stuffing mix and hydrated. The alpha-amylase activity is measured by the malt index as determined using an amylograph (recording viscometer). The malt index of the flour being at least about 1000 and preferably at least about 1500. The protein content of the flour is preferably at least about 9% by weight of the flour (as calculated on a 14% moisture basis), and the ash content is preferably at most about 0.5% by weight of the flour (as calculated on a 14% moisture basis). Depending on the flour employed additional ingredients may be added as is common in the art, such as vital wheat gluten.

After the dough has been mixed to full development and rested, the dough can optionally be remixed or reworked prior to dividing the dough. The dough is generally remixed or reworked where additional degassing is needed to obtain the required density and cell structure in the resultant baked bread. In certain dough formulations, such as formulations with a high corn meal content or lean formulations (low in fat, milk and sugar), the requisite density and cell structure may be obtained without a remixing or reworking step. However, in other dough formulations where there is substantial yeast action during the resting step, a remixing or reworking step for an effective period of time is required to degas the dough in order to obtain the required density and cell structure. The remixing or reworking being carried out without over mixing which can result in a sticky or pasty dough which is difficult to handle.

Prior to baking conventionally the dough would be proofed to allowed substantial development and rising of the dough. In the process of this invention, the intermediate or final proofing steps are either eliminated or substantially reduced. The combination of any intermediate and final proofing and oven spring during baking critically must be limited so that the loaf density of the resultant baked bread is within the range of about 17 to 36 lbs./cubic foot, preferably within the range of about 23 to 31 lbs./cubic foot. Such density can be conventionally measured by the displacement of rape seeds method. While preferably such intermediate or final proofing steps are eliminated, some minimal proofing can be tolerated while still obtaining a crumb or cube with the required density and structural strength. For example, when the dough is to be baked by the hearth method (without a baking pan) after the dough has been divided some proofing may be desirable in order to allow the dough to take a desired symmetrical shape or form thus insuring that the resultant baked bread will have a uniform shape thereby facilitating any subsequent handling, such as in the slicing and dicing steps.

Critically during baking the dough is initially subjected to a temperature sufficiently high and for a period of time effective to kill the yeast and thereby prevent substantial oven spring, i.e., preventing the dough from rising substantially during baking. Generally such initial baking temperature should be at least 400° F. (400°–425° F. being preferred), with the period of time the dough is initially subjected to such temperature being dependent upon factors such as dough weight and whether the dough is baked in a pan or by the hearth method (no baking pan) as such factors affect the period of time effective to kill the yeast. After the dough is subjected to the sufficiently high temperatures for an effective period of time the remaining baking cycle can be carried out at conventional temperatures, e.g., baking temperatures of about 350° F. and above. The baking cycle is continued until the bread dough is fully baked, i.e., until the starch in the dough is fully gelatinized, the crust develops a moderately brown color and the internal temperature of the bread reaches about 200°–210° F., preferably 204°–205° F. Employment of the above baking cycle inhibits further gassing and development of the dough and rising of the bread, thus producing a dense bread with a strong cell structure.

When the dough is to be baked the dough is preferably scaled to a relatively high weight as compared to conventional practice which aids in further inhibiting the dough from rising substantially during baking. For example, when the dough is to be baked in a pan the dough is scaled at a weight of 35 to 45 ounces into baking pans with approximately a 10"×4" base, a 10¾"×4¾" top, which is 3" high, as opposed to conventional practice of scaling 20 to 30 ounces of dough in such baking pans. Preferably a dough weight to baking pan volume relationship of at least about 0.2 ounces of dough per cubic inch of pan volume is desirable, the baking pan volume and the high dough mass acting to inhibit substantial rising of the dough. When the dough is to be baked by the hearth method (without a baking pan) the dough is generally scaled to a weight within the range of about 20 to 50 ounces, preferably 35–50 ounces. Thus, the combination of both the absence of a baking pan which the heat must penetrate during baking thus facilitating quick penetration of the initial high temperatures and the high dough mass acts to inhibit the dough from rising substantially during baking.

After baking, the bread may be cooled (typically by exposure to room temperature conditions), depanned (unless hearth method of baking employed), staled from 1 to 4 days, sliced and then diced to an appropriate crumb or cube size and dried generally to a moisture content less than 15%, preferably 4–7%, by weight of the crumbs. The overall density of the resultant crumbs or cubes is within the range of about 12–22 lbs/cubic foot, preferably within the range of about 15 to 20 lbs/cubic foot, the crumb or cube density being measured as detailed below.

The crumbs or cubes utilized in a stuffing mix preferably have the following size distribution, the percentages being indicated by weight of the total crumb weight:

100% by weight pass through a screen with a 1" opening

15% by weight retained on a Tyler 2.5 mesh screen

65% by weight retained on a #14 U.S. standard mesh screen

20% by weight pass through a #14 U.S. standard mesh screen but are retained on a #50 U.S. standard mesh screen As indicated the crumbs or cubes from bread baked according to the process of the present invention are significantly denser and have a much stronger cellular structure than crumbs obtained by existing methods. The density of the crumbs or cubes is determined by placing 155 grams of the crumbs or cubes having the above size distribution and a moisture content of 4–7% into a 1000 ml graduated cylinder, and reading the volume before and after tapping the cylinder 30 times, taking the average volume and calculating density as follows:

$$(155 \text{ g/average vol(ml)}) \times 62.4 = \text{lbs/cubic foot (density)}$$

Crumbs or cubes made according to the process of the present invention generally have a density in the range of about 12 to 22 lbs./cubic foot, preferably about 15 to 20 lbs./cubic foot, in contrast to the density range of crumbs or cubes from bread prepared according to the usual processes which generally have a density of 9 to 12 lbs./cubic foot.

The process of this invention produces a bread with structural strength thus providing a satisfactory base for stuffing which can stand up to processing and cooking conditions without forming a pasty mass. The structural firmness of the bread or bread crumbs or cubes is measured with a shear press as the shear press measurement is directly proportional to the structural firmness of the bread. A Kramer Shear Press (Model T1200) from Food Technology Corporation is employed which has been calibrated and standardized. A sample of bread crumbs or cubes of the size distribution above are ground for 45 seconds at high speed in a blender (Waring—model 7010) and then screened through a #14 U.S. standard mesh screen. From the screened sample of bread (through #14 U.S. standard mesh), 129 grams are weighed out and then added to 171 ml. of room temperature water (60°–70° F.), stirred and then allowed to stand for 5 minutes. The sample with water is then added to the shear press test cell (model CS-1) being careful to eliminate all air pockets. The test cell is covered and placed into position on the shear press so that the blade fingers mesh with the test cell cover grooves. The shear press is set at a 30 second ($\pm 1$ second) stroke time, a 300 lb. load cell is employed and the texture guage switch is set at 300 lbs. force. Then the blade is run down through the test cell, the maximum peak from the curve being recorded. Utilizing this method the bread crumbs or cubes produced by the process of this invention have a standardized shear press unit in the range of about 30 to 160 lbs.-force preferably at least about 50 lbs.-force, compared to bread crumbs produced by typical commercial processes which have a shear press unit generally less than 50 lbs.-force typically from 20 to 30 lbs.-force. This shear press measurement is useful in measuring the structural firmness of the bread crumbs or cubes, however, it does not measure the ability of the crumbs or cubes to stand up to hydration, processing and cooking conditions without forming a pasty mass. While some commercial bread crumbs may have a high structural firmness, they generally will still not have the structural strength to stand up to hydration, processing and cooking conditions without forming a pasty mass.

The crumbs or cubes obtained by the process of this invention can then be utilized in an instant stuffing mix as detailed in U.S. Pat. No. 3,870,803, this patent being incorporated herein by reference. The stuffing mix comprising stuffing flavor components (i.e. seasonings, spices, flavorings and optionally dehydrated vegetables and/or dehydrated fruit), and bread crumbs or cubes prepared by the process of this invention having a particle size such that at least 95% by weight passes through a #2 U.S. standard mesh screen and no greater than 5% by weight passes through a #50 U.S. standard mesh screen. The instant invention being especially relevant to such instant stuffing mixes as the increased handling and processing which the crumbs or cubes are subjected to during preparation for consumption requires a crumb or cube with a greater density and structured strength to prevent the formation of a pasty mass.

Crumbs or cubes prepared from the ordinary baked bread compared to crumbs or cubes prepared according to the process of this invention generally had a weak and thin cell structure of low density, which when added to a stuffing mix (e.g. an instant stuffing mix as in U.S. Pat. No. 3,870,803) and hydrated had a tendency to break down into a pasty mass. In contrast, crumbs or cubes prepared according to the process of the present invention have an excellent taste, are denser and have a stronger cellular structure. The crumbs or cubes hydrate readily but do not collapse when incorporated into a stuffing, and when hydrated they maintain their shape and identity as pieces and do not result in a pasty mass.

ILLUSTRATIVE EMBODIMENT

The following specific embodiments will further serve to illustrate the invention which is not to be limited thereby the invention being defined in the accompanying claims.

The dough formulation set forth in Table A below, except for the salt, was mixed together in a horizontal dough mixer for six minutes and thereafter the salt added and mixing continued for another three minutes at moderate speeds. The temperature during mixing was maintained at 78°–82° F. The blended dough was then transferred to a horizontal holding trough and maintained at ambient temperature for approximately one hour.

Following this rest period, the dough was transferred to the horizontal mixer and mixed at low speed for 30 seconds and then at high speed for 30 seconds. The bread dough was then divided into 40 ounce portions, rounded, sheeted, rolled into a loaf shape, and placed in baking pans with a 10"×4" base, a 10¾"×4¼" top and which is 3" high. No proofing steps were carried out.

The bread was then baked at a temperature of 420° F. for 50 minutes after which time the internal temperature of the loaf had risen to approximately 205° F. The density of the loaf was approximately 30 lbs./cubic foot. The bread was racked and staled for approximately two days and then sliced and diced into crumbs or cubes and dried to a moisture content within the range of 4–7%. Sample crumbs or cubes having the size distribution set forth above were then utilized in a six to one ratio with crumbs or cubes of brown bread prepared in the same manner as the white bread except for the addition of caramel coloring. The crumbs or cubes had an average density of approximately 19 lbs/cubic foot and a standardized shear press unit within about 90 to 110 lbs.-force. The bread crumbs or cubes thus prepared were then utilized as the only crumb in a stuffing mix to prepare a stuffing as described in U.S. Pat. No. 3,870,803. When the stuffing mix was hydrated the crumbs or cubes maintained their individual identity and did not form a pasty mass. A very tasty stuffing resulted.

Bread crumbs or cubes were processed utilizing the sponge dough method with the formulation set forth in Table B with similar satisfactory results obtained. Bread crumbs or cubes were also prepared utilizing the nutrient-brew method shown in Table C and processed to a fully developed state using the continous dough method.

In each case a bread loaf having a density in excess of 25 lbs/cubic foot and bread crumbs or cubes having a density in excess of 15 lbs/cubic foot and a standardized shear press unit in excess of 90 lbs.-force were obtained. The bread crumbs or cubes had a strong cell structure and maintained their individual identity when incorporated in a stuffing. The crumbs or cubes were also utilized as the only crumb in the stuffing mix to prepare a stuffing as described in U.S. Pat. No. 3,870,803.

While the invention has been explained by a detailed description of certain specific embodiments, it is understood that various modifications and substitutions can be made in any of them within the scope of the appended claims which are intended also to include equivalents of such embodiments.

TABLE A
BREAD FORMULA (% of flour basis) STRAIGHT DOUGH METHOD

| Ingredient | Per Cent (Flour Basis) |
|---|---|
| Enriched Unbleached Bromated Wheat Flour (Malt Index = 1500 + Protein = 11.8% Ash = 43%) | 100 |
| Water | 60 |
| Sugar | 8.0 |
| Shortening | 3.0 |
| Milk Replacer | 2.0 |
| Salt | 2.5 |
| Yeast | 2.0 |
| Calcium Propionate | .31 |

TABLE B
BREAD FORMULA (% of flour basis) SPONGE DOUGH METHOD

| Ingredient | Sponge | Dough |
|---|---|---|
| Enriched Unbleached Bromated Wheat Flour (Malt Index = 1500 + Protein = 11.8% Ash = .43%) | 70 | 30 |
| Water | 45 | 20 |
| Yeast | 2.5 | |
| Shortening | 3.0 | |
| Salt | | 2.3 |
| Milk Replacer | | 2.0 |
| Sugar | | 8.0 |
| Mold Inhibitor | | .31 |
| (Calcium Propionate) | | |

TABLE C
BREAD FORMULA (% of flour basis) NUTRIENT-BREW METHOD

| Ingredient | Per Cent (Flour Basis) |
|---|---|
| TOTAL INGREDIENTS | |
| Enriched Unbleached Bromated Wheat Flour (Malt Index = 1500 + Protein = 11.8% Ash = .43%) | 100.0 |
| Water | 62.4 |
| Sugar | 8.1 |
| Shortening | 2.9 |
| Salt | 2.5 |
| Milk Substitute | 2.0 |
| Yeast | 2.0 |
| Calcium Propionate | 0.31 |
| NUTRIENT MAKE UP | |
| Water | 73.1 |
| Sugar | 20.1 |
| Milk Substitute | 5.9 |
| Calcium Propionate | 0.9 |
| | 100.0 |
| BREW MAKE UP | |
| Water | 81.3 |
| Yeast | 11.5 |
| Sugar | 6.5 |
| Salt | 1.4 |
| Buffer (for removal of the hardness in the water) | 0.3 |
| | 100.0 |
| DOUGH MAKE-UP | |
| Flour | 100.0 |
| Water | 22.1 |
| Nutrient | 34.1 |
| Brew | 18.8 |
| Shortening (Liquid) | 2.9 |
| Salt | 2.2 |

What is claimed is:

1. A process for preparing bread crumbs or cubes having a high density, a relatively strong cell structure and suitable for use in a stuffing mix, comprising the steps of: mixing a yeast containing bread dough to a fully developed state, resting said fully developed dough, dividing said dough, and then baking said dough at an initial temperature which is sufficiently high and for a period of time effective to kill the yeast within said dough while additionally preventing substantial rising of the dough during said baking, thereafter continuing the baking until the bread dough is fully baked, thereby producing a baked bread having a density within the range of about 17 to 36 lbs/cubic foot, said process being carried out with a proofing step within the range of no proofing step to a minimal proofing step prior to the baking of the dough, staling and dividing the baked bread into crumbs or cubes which are suitable for use in a stuffing mix and do not form a pasty mass upon hydration and cooking.

2. Process of claim 1 wherein said crumbs or cubes are dried to a moisture content less than 15% by weight.

3. Process of claim 1 wherein said crumbs or cubes have a standardized shear press unit in the range of about 30 to 160 lbs.-force.

4. Process of claim 1 wherein said crumbs or cubes have a standardized shear press unit of at least about 50 lbs.-force.

5. Process of claim 3 wherein said crumbs or cubes have an average density within the range of about 12 to 22 lbs/cubic ft.

6. Process of claim 5 wherein said crumbs or cubes have an average density within the range of about 15 to 20 lbs/cubic ft.

7. Process of claim 1 wherein said baked bread has a density within the range of about 23 to 31 lbs/cubic foot.

8. Process of claim 1 wherein said initial baking temperature is at least about 400° F.

9. Process of claim 8 wherein said initial baking temperature is within the range of about 400° F. to 425° F.

10. Process of claim 8 wherein the baking is continued at temperatures of at least about 350° F.

11. Process of claim 10 wherein the baking is continued until the internal temperature of the bread dough is within the range of about 200° F. to 210° F.

12. Process of claim 1 wherein the yeast containing bread dough comprises: 100% by weight of a flour, 50 to 70% by weight of water, 0 to 3% by weight of salt, 0 to 8% by weight of sugar, 1 to 2.5% by weight of yeast, 0 to 8% by weight of shortening, 0 to 4% by weight of milk or milk substitute, 0 to 0.5% by weight of color and 0 to 0.4% by weight of a mold inhibitor, all percentages being by weight based upon flour being 100%.

13. Process of claim 12 wherein the bread dough contains less than 4% by weight of shortening.

14. Process of claim 12 wherein the flour has a malt index of at least about 1000.

15. Process of claim 14 wherein the flour has a malt index of at least about 1500, a protein content of at least about 9% and an ash content of at most about 0.5%.

16. Process of claim 1 wherein the dough is baked in a baking pan.

17. Process of claim 16 wherein the dough weight scaled into the baking pan is at least about 0.2 ounces of dough per cubic inch of pan volume.

18. Process of claim 17 wherein 35 to 45 ounces of dough are scaled into a baking pan with a 10"×4" base, a 10¾"×4¾" top and which is 3" high.

19. Process of claim 1 wherein said process is carried out without any proofing step.

20. Process of claim 1 wherein the dough is baked without any baking pan and prior to baking the dough is proofed to a degree sufficient to allow the dough to take a desired symmetrical shape or form.

21. Process of claim 20 wherein the dough prior to baking is scaled to a weight within the range of 20 to 50 ounces.

22. Process of claim 21 wherein the dough is scaled to a weight within the range of 35 to 50 ounces.

23. Process of claim 1 further comprising remixing or reworking the rested dough prior to dividing the dough.

24. A bread crumb or cube prepared by the process of claim 1.

25. A stuffing mix for ready hydration to form a stuffing composition comprising: a stuffing flavor component and bread crumbs or cubes prepared by the process of claim 1.

* * * * *